US008875767B2

(12) United States Patent
Schmid et al.

(10) Patent No.: US 8,875,767 B2
(45) Date of Patent: Nov. 4, 2014

(54) APPARATUS FOR COATING WORKPIECES

(75) Inventors: Johannes Schmid, Starzach/Wachendorf (DE); Axel Petrak, Horb am Neckar (DE)

(73) Assignee: Homag Holzbearbeitungssysteme AG, Schopfloch (DE)

(*) Notice: Subject to any disclaimer, the term of this patent is extended or adjusted under 35 U.S.C. 154(b) by 54 days.

(21) Appl. No.: 13/216,290

(22) Filed: Aug. 24, 2011

(65) Prior Publication Data

US 2012/0048473 A1 Mar. 1, 2012

(30) Foreign Application Priority Data

Aug. 24, 2010 (EP) ..................................... 10173829

(51) Int. Cl.
| | | |
|---|---|---|
| B29C 63/00 | (2006.01) | |
| B27D 5/00 | (2006.01) | |
| B23K 26/30 | (2014.01) | |
| B23K 26/08 | (2014.01) | |

(52) U.S. Cl.
CPC .............. *B29C 63/003* (2013.01); *B27D 5/003* (2013.01); *B23K 26/425* (2013.01); *B23K 26/0846* (2013.01)
USPC ...................................................... 156/380.9

(58) Field of Classification Search
USPC ............... 156/272.2, 272.8, 251, 380.9, 583, 156/379.6, 499
See application file for complete search history.

(56) References Cited

U.S. PATENT DOCUMENTS

| | | | | |
|---|---|---|---|---|
| 4,067,762 A | * | 1/1978 | Rhoads ......................... | 156/250 |
| 4,468,274 A | * | 8/1984 | Adachi ......................... | 156/320 |
| 5,700,347 A | * | 12/1997 | McCowin ..................... | 156/425 |
| 5,756,975 A | * | 5/1998 | Harris et al. .................. | 219/696 |
| 6,287,410 B1 | * | 9/2001 | Klemarewski ............. | 156/273.7 |
| 6,451,152 B1 | * | 9/2002 | Holmes et al. ............. | 156/272.8 |
| 2008/0089382 A1 | | 4/2008 | Eigler et al. | |
| 2008/0314513 A1 | * | 12/2008 | Gauss et al. .................. | 156/277 |

FOREIGN PATENT DOCUMENTS

| | | |
|---|---|---|
| DE | 3027590 A1 | 2/1982 |
| EP | 1800813 A2 | 6/2007 |
| JP | 61020680 A | 1/1986 |
| WO | 01/36168 A1 | 5/2001 |
| WO | 2007028402 A1 | 3/2007 |
| WO | 2010149376 A1 | 12/2010 |

OTHER PUBLICATIONS

Machine Translation of EP1800813A2; Nov. 23, 2006.*
Translation of the relevant parts of the Official Notification as issued by the European Patent Office dated Sep. 6, 2012 for App. No. 12177987.0-1262; 6 pages whole document.
Corresponding priority application—EP 101738292 Search Report dated Feb. 8, 2011.

* cited by examiner

*Primary Examiner* — Daniel McNally
(74) *Attorney, Agent, or Firm* — Harness, Dickey & Pierce, PLC

(57) ABSTRACT

The invention relates to an apparatus (1) for coating workpieces (2) which are preferably made at least in sections of wood, wood materials, plastic or the like, comprising a feed apparatus (10) for feeding a coating material, an activation region (20) for activating the fed coating material (2), and a pressing apparatus (40) for pressing the activated coating material (2) onto a workpiece (3). The apparatus according to the invention is characterised in that at least the activation region (20) with the pressing apparatus (40) and the workpiece (3) can be moved and/or rotated relative to one another in a plane of movement perpendicular to the coating plane in the course of the coating process.

20 Claims, 2 Drawing Sheets

APPARATUS FOR COATING WORKPIECES

TECHNICAL FIELD

The invention relates to an apparatus for coating workpieces with a coating material, the workpieces being made in particular of wood, wood materials, plastics or the like. Here a feed apparatus, to which an activation region in which the coating material is activated adjoins, feeds the coating material. A pressing apparatus integrated into the apparatus presses the activated coating material in order to apply it to the workpiece surface to be coated.

Apparatuses of this type are suitable for use in wood processing, in particular the furniture and components industry.

PRIOR ART

These types of coating apparatus are used, for example, for coating workpieces with strip-shaped coating material with a narrow surface. This type of apparatus is known from WO 01/36168 A1. This document discloses an apparatus and a method for applying a coating material to a narrow surface of a workpiece. For this purpose the coating material is continuously fed to the coating process from a roll by means of a feed device. In the case of this through-feed method the coating material is initially activated, and then the activated surface is brought into contact with the surface of the workpiece to be coated. A pressing apparatus supports the contact between the coating material and the workpiece. Moreover, it compensates for slight deviations from an optimal workpiece alignment.

With this apparatus the workpieces are continuously conveyed through the coating apparatus. It is therefore particularly suitable for workpieces which have long, straight and narrow surfaces. These workpieces can be aligned optimally to the coating apparatus for the coating process, and this is an important pre-requisite for a high-quality coating.

If for aesthetic and/or functional reasons a workpiece has a surface to be coated which in at least one plane no longer extends in a straight line, such as for example an arched extension, the active region of the pressing device is no longer sufficient in order to press the coating material continuously onto the surface of the workpiece to be coated.

These coating apparatuses can only ever coat a narrow surface. If coating of other narrow surfaces is also desired, a number of coating cycles are required between which the workpiece is realigned each time and fed again to the coating apparatus. This is laborious, particularly with short runs.

DESCRIPTION OF THE INVENTION

Therefore, the object forming the basis of the invention is to design a coating apparatus such that it enables high-quality coating, even with larger contour deviations of the workpiece. One is concerned here not only with deviations from the ideal shape for reasons relating to production, but also compensating for contours of the workpiece surface to be coated, required for aesthetic and/or functional reasons, which deviate from a level surface.

This object is solved by the invention having the features from claim 1. Advantageous embodiments of the apparatus according to the invention are given in the sub-claims.

The invention is based upon the idea of continuously adjusting the relative distance between the workpiece and the coating apparatus during the coating process.

At least part of the apparatuses required for coating a workpiece are integrated into the apparatus according to the invention. A feed apparatus feeds the coating material to an activation region. After the activation region there is a pressing apparatus for continuously applying the coating material to the workpiece surface to be coated. In order to guarantee contact between the coating material and workpiece surface, even with contoured workpiece surfaces, at least the activation region together with the pressing apparatus and the workpiece can be moved and/or rotated relative to one another in at least one plane of movement in the course of the coating process. There are a number of possibilities here for implementing a relative movement of the workpiece and of the coating device relative to one another so that the coating apparatus can follow possible changes in form of the workpiece surface to be coated. It is therefore conceivable to only convey the workpiece past the fixed coating apparatus by rotation and translation (through feed technique) or to only move the coating apparatus so that, for example, one moves around the workpiece fixed here while applying the coating (stationary technique). However, there can also be the case, for example, with a complex workpiece geometry where it is advantageous to move both the workpiece and the coating apparatus towards one another.

In one preferred embodiment of the apparatus according to the invention the latter has an energy source which activates the coating material in the activation region. Between the energy source and the coating material there are elements for transmitting the energy emitted by the energy source in the form of radiation. These elements convey the radiation within the activation region of the apparatus onto the coating so as to thus activate the coating. In connection with this the activation of the coating can mean, for example, that a property at least in sections present inherently in the coating material, such as adhesability, starts to act by means of the radiation. It is likewise possible for at least part of a layer applied to the coating material by radiation to serve, for example, as an adhesive layer. In one particularly preferred embodiment a laser beam transmits the energy required for activation of the coating material.

In one particularly preferred embodiment of the apparatus according to the invention there is at least in sections an energy trap around the activation region. The energy trap comprises at least one inlet and/or outlet opening so as on the one hand to convey the energy and the coating material into the activation region, and on the other hand to relay the activated coating material to the coating of the workpiece surface. An inlet opening for the radiation is preferably part of the energy trap when the radiation is conveyed from outside into the apparatus. With the aid of the energy trap undesired discharge of the energy-rich activation radiation into the surrounding area is avoided, and so the operational safety of the coating apparatus is increased.

In a further embodiment at least one section of the inside of the energy trap facing towards the coating material is concave or convex in form. This configuration of the energy trap can preferably also serve as a contact surface for the coating material. Here the coating material runs preferably at least along the crown of the concave or convex form of the inside of the energy trap. Furthermore, this section is preferably concave or convex in form such that the direct path to any inlet and/or outlet opening is refused to the radiation in the activation region, in particular the scattered radiation. Therefore the risk to the surrounding area is restricted to a minimum. Furthermore, it is thus ensured that the radiation only acts in the activation region, and for example does not affect the activation state of the coating material outside of the activation region in an uncontrolled manner.

In a further preferred embodiment the inside of the energy trap has at least in sections a coating absorbing the radiation, so that at least scattered radiation resulting when the radiation strikes the coating material is absorbed within the energy trap. A negative effect of this radiation upon the coating material is thus avoided. It is a further advantage that in this way the potential risk of radiation which may possibly be richer in energy or less focussed in the event of a malfunction is reduced.

In a further particularly preferred embodiment of the invention a second energy trap is located in the activation region. This energy trap is disposed behind the point where the radiation strikes the coating material in the direction of the path of the radiation. If there is no coating material at the point where the radiation strikes, but there is radiation, the energy introduced may possibly cause damage in the activation region. The aforementioned second energy trap ensures, therefore, that the energy introduced is absorbed and so increases the safety of the coating apparatus.

In a further preferred embodiment the second energy trap is at least in sections equipped with a coating absorbing the radiation. It is an additional advantage here to design the cross-section of the second energy trap such that back-reflection of the radiation through the energy trap opening is avoided, and so the absorption of radiation in the second energy trap is increased.

According to a further embodiment of the apparatus it is preferable if lasers such as diode lasers, solid-state lasers, fibre lasers, CO2 lasers, or further energy sources, in particular hot air sources, thermal beam sources such as in particular infrared sources, ultrasound sources, magnetic field sources, microwave sources, plasma sources and/or gassing sources are used as the energy source. Here the energy source is integrated into the apparatus, or its radiation is fed by means of fibre optic cables, in particular by means of a fibre coupling and/or by means of optical elements. Each of the aforementioned energy sources has its specific advantages. A laser thus enables a particularly target-orientated and efficient function, whereas infrared and plasma sources allow wide track operation and a good depth effect. Energy sources with ultrasound, magnetic field and microwave operate contact-free and can also introduce further energy into the process while the coating material is being pressed on. Here a magnetic field has in particular a good depth effect. An energy source based upon gassing is particularly well suited to only forming, by acting upon and reacting with the coating material, a material which has adhesive properties.

In a further preferred embodiment the coating material can be cut through by the radiation acting in the activation region before, during or after the coating process. The advantage of this embodiment is that an additional apparatus for cutting the coating material is not required.

According to a further preferred embodiment there is located before and/or after the activation region at least one further energy source, in particular from the list above, for further or additionally treating the coating to be applied. It is therefore possible in an easy way to integrate additional treatment technologies for the coating into the apparatus.

Although the apparatus can be integrated as a fixed component into a production machine, according to a further preferred embodiment it is possible to design the apparatus to fit interchangeably via a coupling means into an appropriate retainer, such as for example a spindle unit. The advantage of this is that by means of the spindle unit, other apparatuses can also be interchanged—and so the vertical production range of the machine is greater. Furthermore, by this type of embodiment it is guaranteed that in the event of a malfunction of the apparatus the latter can be replaced immediately by an equivalent apparatus. Therefore, interruptions to the coating process can be eliminated quickly.

According to a further preferred embodiment of the apparatus according to the invention, in the case of a radiation source located outside of the apparatus, an element feeding the radiation, by means of which the radiation is conveyed from the energy source into the apparatus, is integrated into the apparatus. This element preferably comprises at least one fibre optic cable and one collimator. The point of entry for the radiation is preferably disposed on the axis of rotation of the coupling means so that the radiation passes along said axis of rotation into the apparatus with the activation region. The advantage of this embodiment is that the conductor conveying the radiation can be located fixed relative to the radiation source, and so is not subjected to any torsional loads when the apparatus is rotating.

According to a further particularly preferred embodiment of the invention the beam feed into the apparatus is designed such that the radiation is conveyed from the latter directly or indirectly to its point of striking the coating material. There can be disposed between the beam feed and the striking point elements which change the geometry, direction and/or strength of the radiation. The use of such elements makes it possible to convey the radiation outside of the axis of rotation into the apparatus.

DETAILED DESCRIPTION OF PREFERRED EMBODIMENTS OF THE INVENTION

Figure 1:
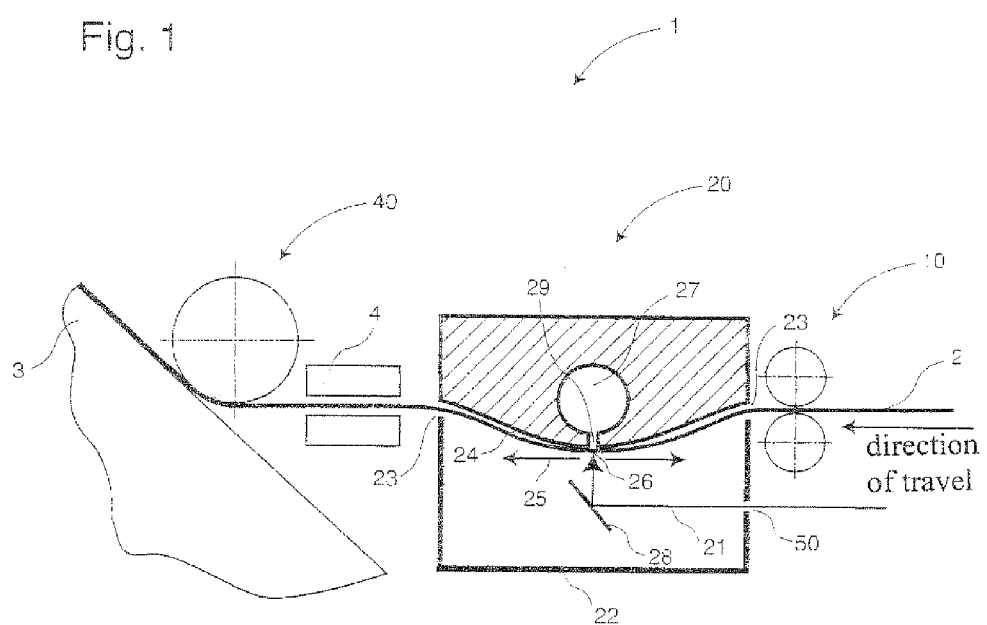
FIG. 1 shows a diagrammatic illustration of the apparatus according to the invention together with a workpiece to be coated.

In the following exemplary embodiments of the invention are described with reference to FIGS. 1-3. Here FIG. 1 is a diagrammatic illustration of an apparatus 1 according to the invention for coating workpieces 3 which are preferably made at least in sections of wood, wood materials, plastic or the like. In order to follow the contour during the coating process the coating apparatus preferably moves relative to the workpiece surface to be coated. Overall, however, there are a number of possibilities for implementing a relative movement of the workpiece and the coating device towards one another so that the coating apparatus can follow any possible changes in form of the workpiece surface to be coated. It is therefore conceivable to only convey the workpiece past the coating apparatus by means of rotation and translation so as to thus guarantee the distance required for the coating. But there can also be a case, for example with a complex workpiece geometry, where it is advantageous to move both the workpiece and the coating apparatus towards one another.

With the coating apparatus 1 it is therefore possible, for example, to move along workpiece contours which for aesthetic and/or functional reasons deviate from level surfaces. The application of the coating material 2 to the workpiece surface is preferably implemented here by means of a pressing apparatus 40. This compensates for unevennesses deviating from the ideal form.

In the coating apparatus 1 there is preferably a feed apparatus 10 on the feed side for the coating material 2. There is preferably disposed behind the feed apparatus 10 the activation region 20, possibly followed by an energy source 3. The pressing apparatus 40 is located on the end of the apparatus 1 according to the invention.

An inlet opening 23 is preferably disposed in the energy trap 22 after the feed apparatus 10. Therefore the feed apparatus 10 conveys the coating material 2 via the inlet opening 23 into the energy trap 22. The precise feeding of the coating material 2 makes it possible to keep the size of the inlet opening 23 small. Furthermore, it is possible to position additional guide apparatuses along the direction of travel of the coating material 2, in particular at its exit from the energy trap 22. In addition, with the feed apparatus 10 the feed speed for the coating material 2 can be controlled, and so the speed of the current coating process can be adjusted.

In the energy trap 22 there is preferably a beam feed 50 by means of which the radiation 21 passes into the energy trap 22. It is particularly preferred if the energy trap 22 has on its inside a convex curve 24 on the crown of which the point 26 at which the radiation 21 strikes the coating material 2 is located. Furthermore, under certain circumstances the energy trap 22 comprises elements 28 which change the geometry, direction and strength of the radiation. The advantage of this is that the radiation 21 can be adapted, for example, to the width of the coating 2 passed through within the framework of the activation, or only specific regions of the coating material 2 can be activated.

When the radiation 21 strikes the striking point 26, scattered radiation 25 results. In connection with this, the preferably convex form of at least one section of the inside of the energy trap 22 has in particular two advantages. On the one hand the convex form 24 leads to the scattered radiation 25 not being able to leave the energy trap 22 on the direct path through the openings 23, and on the other hand the convex surface 24 serves at least in sections as a counter bearing and bearing surface for the coating material 2 in order to convey it past the striking point 26 of the radiation 21 for activation.

Furthermore, a layer absorbing the radiation is preferably located at least in sections on the insides of the energy trap 22. Said layer absorbs in particular the scattered radiation 25 resulting at the striking point 26 and so prevents said scattered radiation from leading to pre- and/or post-activation of the coating material 2.

As viewed in the direction of the path of the radiation there is preferably behind the striking point 26 an opening 29 to a second energy trap 27. If the energy source is activated so that radiation 21 is already provided at the striking point 26, but no coating material 2 is fed yet (for example with faulty conveyance of the edge strip), the second energy trap 27 absorbs the radiation 21. The energy trap 27 has a cross-section which is preferably formed such that radiation 21 passing in through the opening 29 can not pass out again from the opening 29 immediately after reflection. Here the inside of the second beam trap 27 preferably has at least in sections a layer absorbing the radiation. In a further particularly preferred embodiment the coating material 2 can additionally be cut through by the radiation 21 during and/or at the end of the coating process. Here too the second beam trap 27 absorbs the radiation 21 which passes out via the striking point 26 during the separating process.

In order to discharge the heat resulting upon absorption of the radiation 21 the apparatus can have passive cooling ribs and/or active cooling channels for cooling the energy trap 22 and/or second energy trap 27. In this way the apparatus or the materials processed during production, in particular the coating material 2 and/or the workpiece 3 are prevented from being damaged. In connection with this the cooling has the further advantage that disrupting influences upon the temperature of the processing environment are prevented.

After activation of the coating material 2 at the striking point 26 of the radiation 21 the coating material 2 preferably leaves the energy trap 22 through an outlet opening 23. The coating material 2 can thus pass through the activation region 20 on a simple and direct path without thus being subjected to additional bending stresses.

In particular, further energy sources 3 for additional treatment of the coating material 2 can be located after the outlet opening 23. These energy sources 3 can, however, also or additionally be located before the activation region as viewed in the direction of travel.

Figure 2:
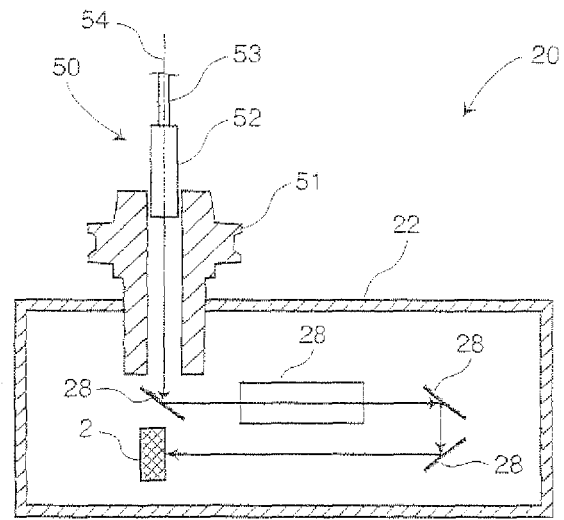
FIG. 2 shows a sectional view of the beam feed of the apparatus according to the invention wherein the radiation is conveyed along the axis of rotation of the coupling means into the apparatus.

In FIG. 2 the beam feed 50 is shown, the beam preferably being conveyed along the axis of rotation of the coupling means 51 into the activation region 20. Here the element feeding the radiation is preferably fastened fixed relative to the external energy source. Here the element feeding the radiation preferably comprises a fibre optic cable 53 and a collimator 52. The advantage of feeding the beam along the axis of rotation 54 is that the coating apparatus 1 can rotate about the axis of rotation 54 of the coupling means 51 without the element feeding the radiation having to follow this rotation. This is particularly advantageous with fibre optic cables because they are sensitive to torsion.

Figure 3:
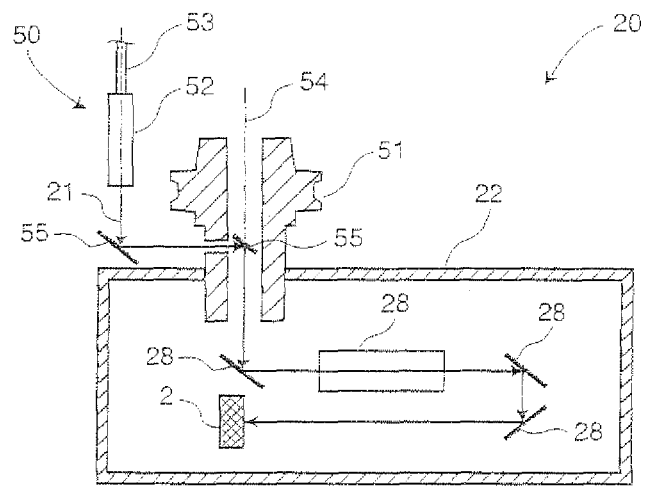
FIG. 3 shows a sectional view of the beam feed of the apparatus according to the invention wherein the radiation is initially fed from outside of the axis of rotation of the coupling means and then passes along the axis of rotation into the apparatus.

FIG. 3 shows a beam feed 50 via the side of a coupling means 51. For this purpose an element feeding the radiation is disposed outside of the coupling means 51, preferably fixed in relation to the apparatus 1. In addition, there are elements 55 in the path of the beam for manipulating the geometry, strength and/or direction of the beam 21. The beam 21 is preferably deflected onto the axis of rotation 54 of the coupling means into the coating apparatus 1 with the elements 55. It is a particular advantage of this configuration that the complexity of the structure of the coupling means 51 is reduced. In addition, the beam feed 50 in the region of the element feeding the radiation is more easily accessible if malfunctions occur.

The invention claimed is:

1. An apparatus for coating workpieces comprising:
a feed apparatus for feeding a coating material;
an activation region for activating the fed coating material; and
a pressing apparatus for pressing the activated coating material onto a workpiece, wherein at least the activation region with the pressing apparatus and the workpiece can be moved and/or rotated relative to one another in a plane of movement perpendicular to a coating plane in the course of the coating process, wherein the activation region is substantially surrounded by an energy trap which has an outlet opening for conveying the activated coating material,
wherein the apparatus is designed to fit interchangeably via a coupling means into a retainer.

2. The apparatus according to claim 1, wherein activation of the coating material is implemented with an energy source.

3. The apparatus according to claim 2, wherein the energy source is selected from the group consisting of a laser, a hot air source, a thermal beam infrared source, a radiation source, an ultrasound source, a magnetic field source, a microwave source, a plasma source and gassing sources, and wherein the energy source is integrated into the apparatus or radiation of the energy source is fed by fiber optic cables.

4. The apparatus according to claim 3, wherein the coating material can be cut through by radiation acting in the activation region.

5. The apparatus according to claim 4, wherein radiation is fed by means of a feed element, comprising at least one fiber optic cable and a collimator, via coupling means, along an axis of rotation thereof and/or another feed point.

6. The apparatus according to claim 5, wherein the radiation is fed in a beam feed directly and/or indirectly via elements which change the geometry, direction and/or strength of the radiation.

7. The apparatus according to claim 4, wherein there is located before and/or after the activation region at least one further energy source for treating the coating material.

8. The apparatus according to claim 2, wherein the energy source is radiation.

9. The apparatus according to claim 1, wherein a second energy trap is provided.

10. The apparatus according to claim 9, wherein the cross-section of the second energy trap is designed such that back-reflection through an energy trap opening of the second energy trap is avoided.

11. The apparatus according to claim 9, wherein the second energy trap is located in a direction of radiation behind a point wherein radiation strikes the coating material.

12. The apparatus according to claim 9, wherein at least one of the inside of the energy traps has energy-absorbent properties.

13. The apparatus according to claim 1, wherein at least one section of the inside of the energy trap facing towards the coating material is formed concavely or convexly as a counter-bearing.

14. The apparatus according to claim 13, wherein a direct path to any inlet and/or outlet opening is refused to any scattered radiation resulting in the activation region.

15. The apparatus according to claim 1, wherein the apparatus has passive cooling ribs and/or active cooling channels for cooling the energy trap.

16. The apparatus according to claim 1, wherein within the energy trap there are elements which change the geometry, direction and/or strength of energy striking a surface of the coating material.

17. The apparatus according to claim 1, wherein the retainer is a spindle unit.

18. The apparatus according to claim 1, wherein the energy trap is a housing including at least a portion facing a contact surface of the coating material.

19. The apparatus according to claim 1, wherein the coating material includes a coating surface and a second surface opposite the coating surface, and wherein the energy trap faces the coating surface and the second surface.

20. An apparatus for coating workpieces, comprising:
a feed apparatus for feeding a coating material;
an activation region for activating the fed coating material with radiation, and
a pressing apparatus for pressing the activated coating material onto a workpiece, wherein:
at least the activation region with the pressing apparatus and the workpiece can be moved and/or rotated relative to one another in a plane of movement perpendicular to a coating plane in a course of the coating process;
wherein the activation region is substantially surrounded by an energy trap which has an outlet opening for conveying the activated coating material; and
wherein the radiation is fed to the apparatus by means of a feed element, comprising at least one fiber optic cable and a collimator.

* * * * *